United States Patent
Kollencheri Puthenveettil

(10) Patent No.: US 11,145,122 B2
(45) Date of Patent: Oct. 12, 2021

(54) SYSTEM AND METHOD FOR ENHANCING AUGMENTED REALITY (AR) EXPERIENCE ON USER EQUIPMENT (UE) BASED ON IN-DEVICE CONTENTS

(71) Applicant: SAMSUNG ELECTRONICS CO., LTD., Suwon-si (KR)

(72) Inventor: Dipin Kollencheri Puthenveettil, RM Nagar (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/917,202

(22) Filed: Mar. 9, 2018

(65) Prior Publication Data
US 2018/0261011 A1    Sep. 13, 2018

(30) Foreign Application Priority Data
Mar. 9, 2017   (IN) ............................ 201741008331

(51) Int. Cl.
*G06T 19/00*   (2011.01)
*G06K 9/00*    (2006.01)
(Continued)

(52) U.S. Cl.
CPC ............ *G06T 19/006* (2013.01); *G06F 3/011* (2013.01); *G06F 16/435* (2019.01);
(Continued)

(58) Field of Classification Search
CPC ..... G06T 19/006; G06F 16/435; H04L 67/38; H04L 67/30; G06K 9/00671
See application file for complete search history.

(56) References Cited

U.S. PATENT DOCUMENTS 8,823,855 B2   9/2014  Hwang
9,665,939 B2*  5/2017  Nakayama ............ G06T 3/0093
(Continued)

FOREIGN PATENT DOCUMENTS

WO    2015/050288 A1    4/2015

OTHER PUBLICATIONS

Search Report dated Jul. 5, 2018, issued by the International Searching Authority in International Application No. PCT/KR2018/002827 (PCT/ISA/210).

(Continued)

*Primary Examiner* — Samantha (Yuehan) Wang
(74) *Attorney, Agent, or Firm* — Sughrue Mion, PLLC

(57) ABSTRACT

The various embodiments of the disclosure disclose a system and method for enhancing augmented reality experience on one or more connected user equipment (UEs) using in-device contents. The method comprises of performing, by a connected User Equipment (UE), an automatic registration of one or more model objects, performing, by the connected UE, at least one of a user interest based content analysis, semantic based content analysis, and context based content analysis of the in-device contents, identifying the one or more registered model objects to associate with the analyzed content, and associating, by the connected UE, the in-device contents with the one or more registered model objects to enhance the augmented reality experience with the in-device contents.

19 Claims, 8 Drawing Sheets

(51) Int. Cl.
*G06F 3/01* (2006.01)
*H04L 29/08* (2006.01)
*G06F 16/435* (2019.01)
*H04L 29/06* (2006.01)

(52) U.S. Cl.
CPC .......... *G06K 9/00671* (2013.01); *H04L 67/30* (2013.01); *H04L 67/38* (2013.01)

(56) References Cited

U.S. PATENT DOCUMENTS

| | | | | |
|---|---|---|---|---|
| 10,110,678 | B2* | 10/2018 | Hebsur | G06F 3/011 |
| 10,451,874 | B2* | 10/2019 | Kimura | G06F 1/163 |
| 2008/0074424 | A1* | 3/2008 | Carignano | G06T 13/80 |
| | | | | 345/473 |
| 2010/0259464 | A1* | 10/2010 | Chang | H04M 1/7253 |
| | | | | 345/2.3 |
| 2011/0310227 | A1 | 12/2011 | Konertz et al. | |
| 2012/0259744 | A1 | 10/2012 | Ganesh et al. | |
| 2013/0010052 | A1* | 1/2013 | Ihara | H04N 7/15 |
| | | | | 348/14.07 |
| 2013/0232011 | A1 | 9/2013 | Gupta et al. | |
| 2014/0063059 | A1 | 3/2014 | Chiang | |
| 2014/0108528 | A1 | 4/2014 | Papakipos et al. | |
| 2014/0253743 | A1 | 9/2014 | Loxam et al. | |
| 2014/0267405 | A1 | 9/2014 | Mullins | |
| 2015/0227609 | A1* | 8/2015 | Shoemaker | G06F 16/434 |
| | | | | 707/737 |
| 2015/0279101 | A1* | 10/2015 | Anderson | G06F 16/954 |
| | | | | 345/633 |
| 2015/0347850 | A1* | 12/2015 | Berelejis | H04L 67/22 |
| | | | | 345/633 |
| 2016/0004779 | A1* | 1/2016 | Sathish | G06F 17/2705 |
| 2016/0086381 | A1 | 3/2016 | Jung et al. | |
| 2016/0224657 | A1 | 8/2016 | Mullins | |
| 2017/0038829 | A1 | 2/2017 | Lanier et al. | |
| 2018/0075644 | A1* | 3/2018 | Johnston | G06F 3/011 |

OTHER PUBLICATIONS

Written Opinion dated Jul. 5, 2018, issued by the International Searching Authority in International Application No. PCT/KR2018/002827 (PCT/ISA/237).
Communication dated Jan. 20, 2020 issued by the European Intellectual Property Office in counterpart European Application No. 18764813.4.
Communication dated Jun. 24, 2020 by the European Patent Office in counterpart European patent Application No. 18764813.4.

* cited by examiner

SYSTEM AND METHOD FOR ENHANCING AUGMENTED REALITY (AR) EXPERIENCE ON USER EQUIPMENT (UE) BASED ON IN-DEVICE CONTENTS

CROSS-REFERENCE TO RELATED APPLICATION

This application is based on and claims priority under 35 U.S.C. § 119 to Indian Patent Application No. 201741008331, filed on Mar. 9, 2017, in the Indian Patent Office, the disclosure of which is incorporated by reference herein in its entirety.

BACKGROUND

1. Field

The disclosure generally relates to augmented reality applications and more particularly relates to a system and method for enhancing augmented reality (AR) experience on user equipment (UE) based on model objects.

2. Description of Related Art

Modern computing and display technologies have facilitated the development of systems for so called "virtual reality" (VR) or "augmented reality" (AR) experiences, wherein digitally reproduced images or portions thereof are presented to a user in a manner wherein they seem to be, or may be perceived as, real. A virtual reality (VR) scenario typically involves presentation of digital or virtual image information without transparency to other actual real-world visual input; an augmented reality (AR) scenario typically involves presentation of digital or virtual image information as an augmentation to visualization of the actual world around the user. For example, an augmented reality scene may allow a user of AR technology—see one or more virtual objects super-imposed on, overlaid on, or amidst real world objects or real objects (RO) such as, but not limited to, a real-world soccer match-like setting featuring players, people, hoardings, billboards, stadium in the background, and the like.

According to computer vision and object recognition technology, AR works on the following steps: one or more images of an object are captured using an AR device. Further, retinal processing of the captured images are performed, wherein luminance and contrast of the images are adjusted according to the requirement. Further, object detection is performed in the captured images, wherein object boundaries are identified, motion processing is performed, and spatial attention is performed. Further, the object is classified, wherein the object is classified based on the identified boundaries and learned for future references, and thereby recognizing the object. Various technologies are available to perform AR and detect real world objects or real objects (RO). Finally, the real world view seen by the user through his AR device is super-imposed with additional supplemental information based on the objects identified in the view.

Current systems and methods for detecting real objects (ROs) identify the ROs and display the ROs to the user in AR view, but they do not enhance the experience to the user by augmenting the real world view with in-device contents. Further, the current systems and methods do not organize one or more applications present in user equipment (UE), based on the AR view. Further, the current system and methods do not perform content analysis and provide the user with necessary content automatically based on the real world view captured by an AR device.

In view of the foregoing, there is a need for a system and method for enhancing augmented reality (AR) experience on user equipment (UE) wherein the system and method addresses the problems described herein above.

The above mentioned shortcomings, disadvantages and problems are addressed herein and which will be understood by reading and studying the following specification.

SUMMARY

The various embodiments of the disclosure disclose a system and method for enhancing augmented reality (AR) experience on a user equipment (UE) by associating real objects (ROs) with in-device contents with one or more registered model objects.

The disclosure involves registration of one or more model objects with the one or more connected devices of user. Upon registration of the one or more model objects, the connected device creates association between in-device contents and the registered model objects. The UE referred herein can be an AR device, which is worn by the user. The AR device shares the visual cues of a real object in the user view to one or more connected UE. These one or more connected UEs then compares the received visual cues against a plurality of model objects stored in the respective one or more connected UEs. If a match is found with any of the model objects in any of the one or more connected UEs, then the contents associated with the matching model objects are organized for easy access by the relevant applications linked with the contents.

According to an embodiment of the disclosure, automatic registration of one or more model objects includes identifying the model objects for registration based on user-interest profiling, analyzing the in-device contents, by monitoring user or device context, identifying the one or more model objects over social networking service (SNS) interactions, registration during smart object interactions, registering model objects, during application installations, identifying model objects registered by services, identifying model objects registered by Social Networking Services (SNS), identifying model objects based on location based services (LBS), and identifying model objects registered during advertisements.

In an embodiment of the disclosure, the one or more model objects in the device includes at least one of, but not limited to, pre-loaded model object categories, automatically registered model objects, and the like, without departing from the scope of the disclosure. In an embodiment of the disclosure, the model objects are stored on at least one of a memory of the connected UE, on a cloud (e.g., cloud storage, remote storage, cloud-based storage, etc.), and on a database of an Augmented Reality (AR) server.

In an embodiment of the disclosure, association of one or more model objects with the in-device content is performed through at least one of, but not limited to, semantic object mapping, user interest profiling, social networking interactions, Smart object interactions, content provider driven, context inference, and the like.

In an embodiment of the disclosure, the method further includes enabling model object management including least one of, but not limited to, de-registering of one or more model objects, activating contents for augmentation events, obtaining model object registration decisions, and the like.

In an embodiment of the disclosure, the method further includes enabling cross device content management based on one or more model objects, the method includes operations of identifying model objects stored in any of the connected user devices based on the real object (RO) in the AR view by applying one of a specific or generic object recognition method, sharing extracted visual cues of the real object with the one or more connected user devices, verifying if the extracted visual cue matches with a registered specific or generic model object having an associated content, customizing a device application behavior based on the associated content, and enhancing the user interaction by placing the device application on a user interface of the user device.

According to another embodiment of the disclosure, a method for enhancing augmented reality experience on one or more connected user equipment (UEs) using in-device contents, the method includes operations of identifying, by an augmented reality (AR) device, at least one real object (RO), extracting, by the AR device, a set of visual cues, sharing, by the AR device, the extracted set of visual cues to the one or more connected UE's, comparing by each of the one or more connected UE's the set of visual cues received from the AR device with a predefined category of one or more registered model objects, identifying at least one model object having an associated in-device content, and associating in-device content for the RO with the at least one model object.

In yet another embodiment of the present disclosure, there is a method for enhancing augmented reality experience on an electronic device, the method including: automatically registering a model object in a model object category, the model object category including a plurality of model objects; analyzing an in-device content; identifying the model object of the plurality of model objects of the model object category to associate with the analyzed in-device content; associating the in-device content with the identified model object; and based on a set of visual cues of Real Object (RO) corresponding to the identified model object being received from an external augmented reality (AR) device, displaying Augmented Reality (AR) corresponding to the associated in-device content.

In another embodiment of the present disclosure, there is a method for enhancing augmented reality experience on one or more connected electronic devices using in-device content, the method including: identifying, by an external augmented reality (AR) device, at least one real object (RO); obtaining, by the external AR device, a set of visual cues of the at least one RO; sharing, by the external AR device, the obtained set of visual cues with the one or more connected electronic devices; comparing, by one of the one or more connected electronic devices, the set of visual cues received from the external AR device with a predefined model object category, the predefined model category including a plurality of model objects; identifying, by the one of the one or more connected electronic devices, at least one model object associated with an in-device content; and associating, by the one of the one or more connected electronic devices, the in-device content for the RO with the at least one model object.

In yet another embodiment of the present disclosure, there is an electronic device for enhancing augmented reality experience, the electronic device including: a display; processor; wherein the processor is configured to: automatically register a model object in a model object category, the model object category including a plurality of model objects, analyze in-device content, identify the model object of the plurality of model objects of the model object category to associate with the analyzed in-device content, associate the in-device content with the identified model objects, and based on a set of visual cues of Real Object (RO) corresponding to the identified model object being received from an external augmented reality (AR) device, control the display to display Augmented Reality (AR) corresponding to the associated in-device content.

As described above, the present disclosure is configured to automatically register a real object information descriptor (ROID) or a model object and associate in-device contents with the model object, thereby providing information including private in-device contents and thus enhancing the user experience.

The foregoing has outlined, in general, the various aspects of the invention and is to serve as an aid to better understand the more complete detailed description which is to follow. In reference to such, there is to be a clear understanding that the disclosure is not limited to the method or application of use described and illustrated herein. It is intended that any other advantages and objects of the disclosure that become apparent or obvious from the detailed description or illustrations contained herein are within the scope of the disclosure.

Meanwhile, the apparatus as referred to herein may be variously expressed as a user equipment (UE), electronic device, user terminal device, electronic device, user terminal apparatus and the like. In addition, the augmented real (AR) device as referred to herein may be variously expressed as an external device, external AR device, external apparatus, external AR apparatus and the like.

Meanwhile, an apparatus which acquires visual cues of areal object as referred to herein may be an additional apparatus, but in an embodiment, an apparatus may directly acquire visual cues of a real object as well.

BRIEF DESCRIPTION OF THE DRAWINGS

The other objects, features and advantages will occur to those skilled in the art from the following description of the embodiments and the accompanying drawings in which.

Figure 1:
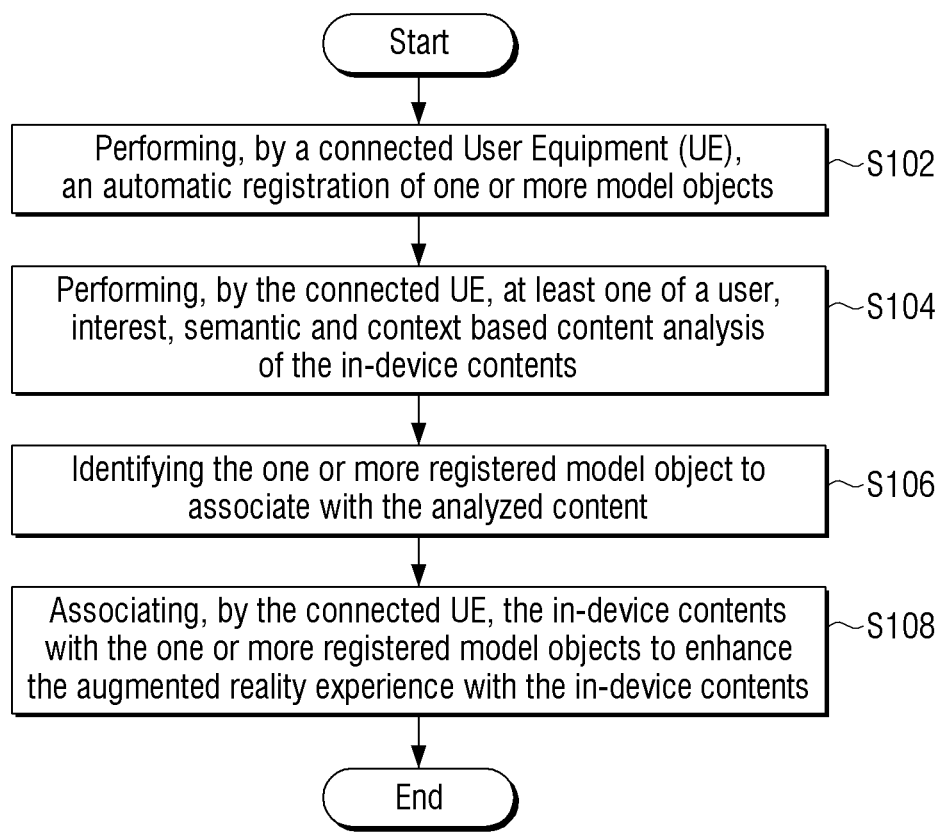
FIG. 1 is a schematic flow diagram illustrating a method for enhancing augmented reality experience on one or more connected user equipment (UEs) using in-device contents, according to an embodiment of the disclosure.

Although specific features of the disclosure are shown in some drawings and not in others, this is done for convenience only as each feature may be combined with any or all of the other features in accordance with the disclosure.

DETAILED DESCRIPTION

The disclosure provides system and method for enhancing augmented reality experience (AR) on one or more connected user equipment (UEs) with in-device contents. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the disclosure. The following detailed description is, therefore, not to be taken in a limiting sense, and the scope of the disclosure is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items. Further, expressions such as "at least one of a, b, and c" should be understood as including only a, only b, only c, both a and b, both a and c, both b and c, all of a, b, and c, or other variations of thereof.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The disclosure provides a system and method for enhancing augmented reality (AR) experience on one or more connected user equipment (UEs) with in-device contents. Various embodiments are described in the present disclosure to describe the working of the method, but not limiting to the scope of the disclosure.

The embodiments herein and the various features and advantages details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

According to an embodiment of the disclosure, a method for enhancing augmented reality (AR) experience on one or more connected user equipment (UEs) with in-device contents is described herein. The disclosure can be used for identifying the real objects (ROs) using augmented reality (AR) and enhancing experience to a user by performing one or more actions based on the identified ROs. The present method has been described with respect to user equipment (UE's) with communication capabilities such as, but not limited to, mobile phone, tablet, laptop, PDA, smart watch, and the like, without departing from the scope of the disclosure.

According to an embodiment of the disclosure, a method for enhancing augmented reality experience on one or more connected user equipment (UEs) using in-device contents, comprises of performing, by a connected user equipment (UE), an automatic registration of one or more model objects. The connected UE (or simply called as "UE" hereinafter) can be connected to one or more other UEs and performs automatic registration of the one or more model objects. The model objects are representation of real objects (RO) and registered on the connected UE. In an embodiment of the disclosure, the one or more model objects in the device can be at least one of, but not limited to, pre-loaded model object categories, automatically registered Model Objects, and the like, without departing from the scope of the disclosure.

In an embodiment of the disclosure, automatic registration of one or more model objects comprises of identifying the model objects for registration based on user-interest profiling, analyzing the in-device contents, by monitoring user or device context, content providers, content analysis, social networks, smart object (internet of things (IoT)) interactions, review service, and the like, without departing from the scope of the disclosure. Further, the method comprises of identifying the one or more model objects over social networking service (SNS) interactions, registration during smart object interactions, and registering model objects, wherein the model objects can be registered during application installations, identifying model objects registered by services, identifying model objects identified based on location based services (LBS), identifying model objects registered during advertisements, and the like, without departing from the scope of the disclosure.

The method further comprises of identifying by the UE one or more registered model objects to associate with the analyzed in-device contents. Based on the identified model objects and in-device contents obtained, the connected UE associates the in-device contents with the one or more registered model objects to enhance the AR experience of the user. In an embodiment of the disclosure, the association of one or more model objects with the in-device content is performed through at least one of, but not limited to, in-device content analysis, user interest profiling, user or device context capturing, and the like, without departing from the scope of the disclosure.

In another embodiment of the disclosure, the one or more model objects are stored on at least one of, but not limited to, a memory of the connected UE, on a cloud, on a database of an Augmented Reality (AR) server, and the like, and the person having ordinarily skilled in the art can understand that the model objects associated with the ROs detected by the AR device can be stored in of the known storage devices from which the connected UE can access the model objects, without departing from the scope of the disclosure.

According to an embodiment of the disclosure, the connected UE performs content analysis of the in-device contents based on one or more of user interests, semantics of the content and context of the contents, without departing from the scope of the disclosure.

In another embodiment of the disclosure, the method for enhancing augmented reality experience further comprises of enabling a model object management on the connected UE, wherein enabling the model object management comprises least one of, but not limited to, de-registering of one or more model objects, activating contents for augmentation events, obtaining model object registration decisions, and the like, without departing from the scope of the invention.

In an embodiment of the disclosure, the method further comprises of enabling cross device content management based on one or more model objects, wherein the method of enabling cross device content management comprises operations of searching for model objects corresponding to the real objects in the AR view by applying one of a specific or generic object recognition method. Further, the method comprises of sharing extracted visual cues of the real object with the one or more connected user devices.

Further, the method comprises operation of verifying if the extracted visual cue matches with a registered specific or generic model object having an associated content. Further, the method comprises of customizing a device application behavior based on the associated content. Further, the method comprises of enhancing the user interaction by placing the device application on a user interface of the user device.

According to another embodiment of the disclosure, a method for enhancing augmented reality experience on one or more connected user equipment (UEs) using in-device contents, the method comprises operations of identifying, by an augmented reality (AR) device, at least one real object (RO). According to the disclosure, user wears the AR device and upon viewing one or more items through AR device, the AR device identifies one or more real objects (ROs). Further, the method comprises of extracting, by the AR device, a set of visual cues. The AR device then shares the extracted set of visual cues to the one or more connected UE's. The AR device can be connected to one or more connected UEs. The different types of UEs that AR device can be connected with are described herein above and thus not described again to avoid repetition.

Further, the method comprises of comparing, by each of the one or more connected UE's, the set of visual cues received from the AR device with a predefined category of one or more registered model objects. The method of identifying, registering, categorizing, and storing one or more model objects is describe herein above and thus described again to avoid repetition.

Further, the method comprises of identifying the contents associated with the corresponding model object that matches with the real object. Further, the method comprises of associating in-device content for the RO with the at least one model object. According to the present embodiment, one or more model objects are registered in one or more user devices of the user, wherein registration of the one or more model objects are described herein above and thus not described again to avoid repetition. Upon completion of registration, the user device performs association of in-device contents to the registered model objects.

FIG. 1 is a schematic flow diagram illustrating a method for enhancing augmented reality experience on one or more connected user equipment (UEs) using in-device contents, according to an embodiment of the disclosure. According to the flow diagram 100, at operation 102, a connected User Equipment (UE) performs an automatic registration of one or more model objects. At operation 104, the connected UE performs at least one of a user interest based content analysis, semantic based content analysis, and context based content analysis of the in-device contents.

Further, at operation 106, the connected UE identifies the one or more registered model objects to associate with the analyzed content. Further, at operation 108, the connected UE associates the in-device contents with the one or more registered model objects, thereby enhancing the augmented reality experience of the user. Here the process of associating in-device content with the one or more registered model objects comprises of comparing visual cues obtained by an AR device against the one or more model objects stored in the connected user devices. If the compared visual cue matches with any of the registered model objects stored in the connected user devices, then the contents associated with the matching model objects are organized for easy access by the relevant applications linked with the contents.

Figure 2:
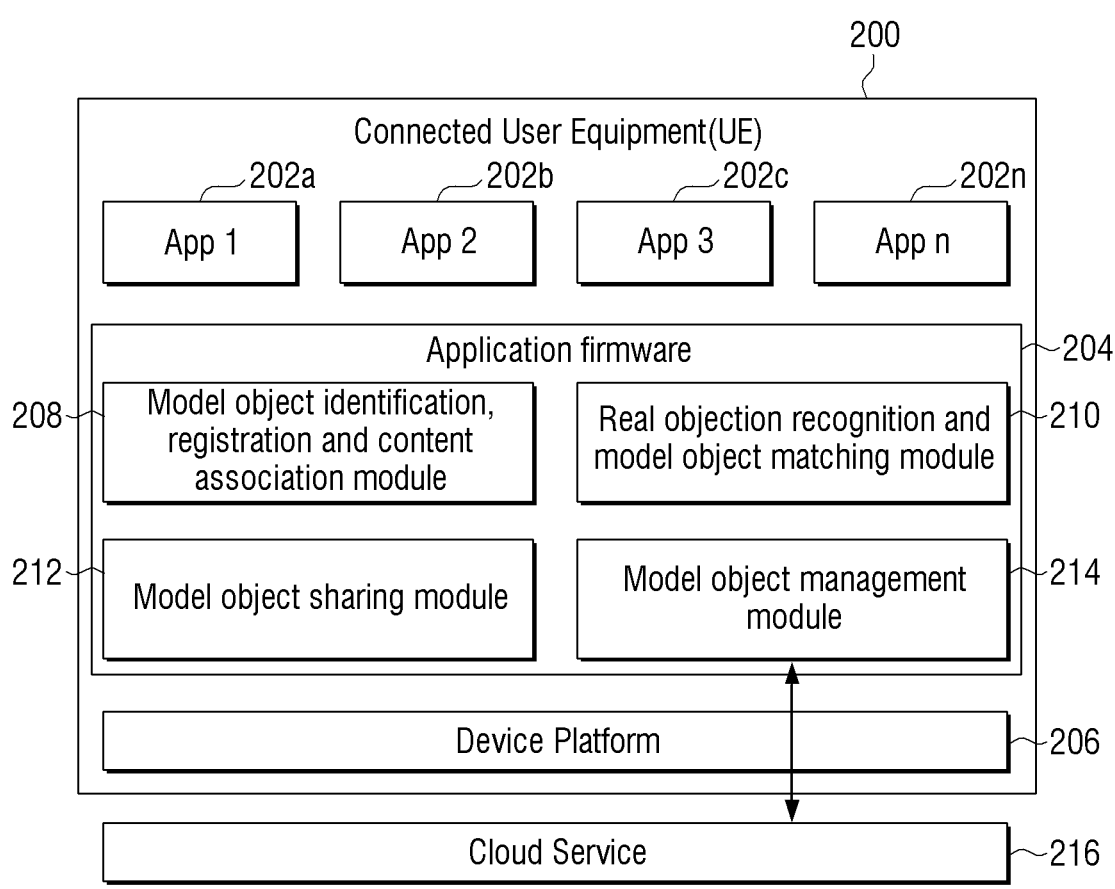
FIG. 2 is a schematic block diagram illustrating architecture of connected user equipment (UE) for enhancing augmented reality experience, according to an embodiment of the disclosure.

FIG. 2 is a schematic block diagram illustrating an architecture of a connected user equipment (UE) 200 for enhancing augmented reality experience, according to an embodiment of the disclosure. According to the FIG. 2, the connected UE 200 comprises of one or more applications App1 202a, App2 202b, App3 202c . . . Appn 202n, an application firmware (FW) 204, and a device platform 206.

According to the FIG. 2, the one or more applications App1 202a, App2 202b, App3 202c . . . Appn 202n, can be installed and running on the connected UE 200. In an embodiment of the disclosure, the applications App1 202a, App2 202b, App3 202c . . . Appn 202n, can be pre-installed, default applications present in the connected UE 200 or can be the applications downloaded and installed by user.

The application firmware (FW) 204 further comprises of model object identification, registration and content association module 208, real objection recognition and model object matching module 210, model object sharing module 212, and a model object management module 214. The model object identification, registration and content association module 208 identifies one or more real objects (ROs), registers the identified ROs and associates content with the ROs. The process of identifying the ROs, registering the ROs and associating the ROs with the content is described herein above and hence not described again to avoid repetition.

The real objection recognition and model object matching module 210 extracts the visual cues of the ROs, recognizes the ROs and checks with a memory for matching model object for the recognized ROs. model object sharing module 212 shares the identified ROs with other connected devices of the connected UE 200. In an embodiment of the disclosure, the model object sharing module 212 can share the identified ROs with the other connected devices over any of the known communication modes, such as, but not limited to, 2G/3G/4G/LTE data, Wi-Fi, Bluetooth, NFC, and the like, without departing from the scope of the disclosure.

The model object management module 214 handles the model objects of the ROs, such as, but not limited to, de-registering of one or more model objects, activating contents for augmentation events, taking model object registration decisions, and the like.

Further, the device platform 206 of the UE 200 can be the medium on which the connected UE 200 can communicate with the other connected devices and server, such as, but not limited to, middleware, operating system, any other hardware components, network ports, and the like.

Further, model object management module 214 of the UE 200 can avail cloud service 216 for activating contents for augmentation events, taking model object registration decisions, and the like by communicating over the device platform 206.

Figure 3:
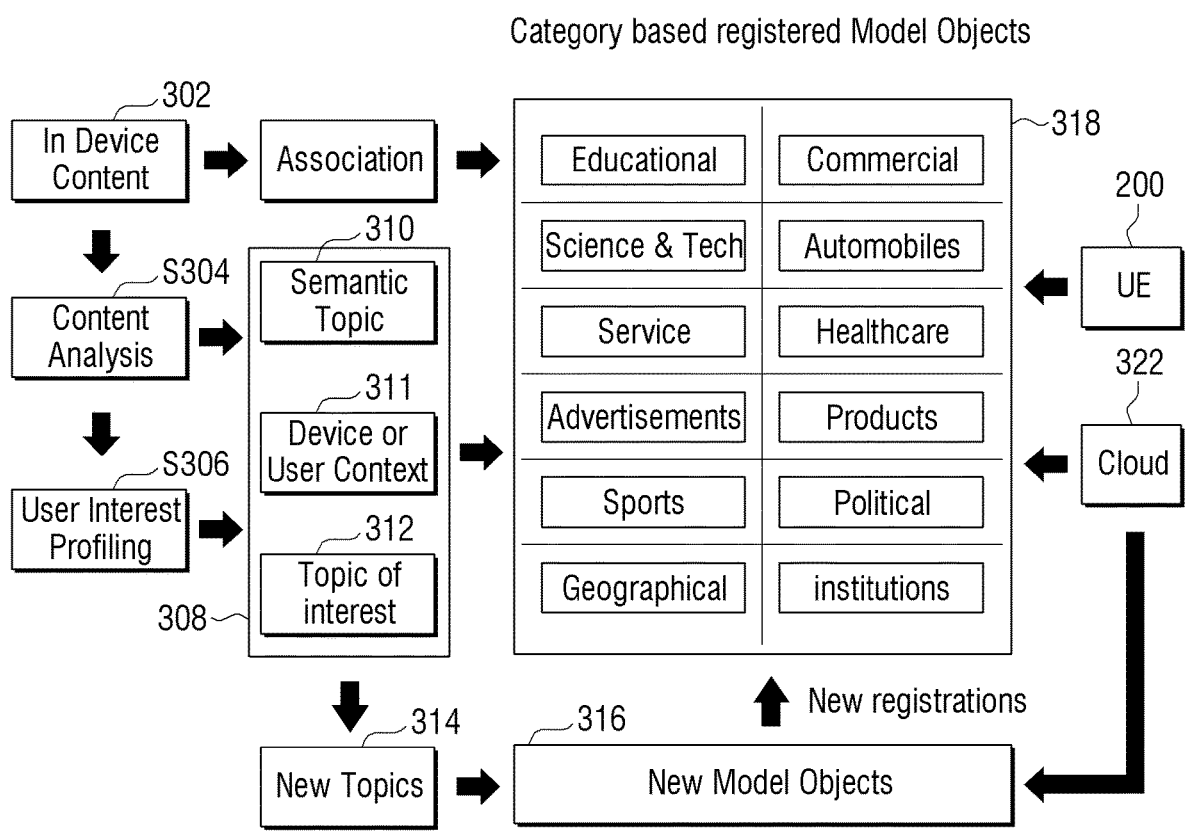
FIG. 3 is a schematic diagram illustrating the process of registration, identification and association, according to an embodiment of the disclosure.

FIG. 3 is a schematic diagram illustrating registration, identification and association, according to an embodiment of the disclosure. According to the FIG. 3, the user equipment (UE) 200 stores a plurality of model objects. The in-device contents 302 are needed to be categorized and saved in the UE 200 so that the model objects can be accessed easily and the corresponding information can be provided to the user efficiently.

Thus, according to the disclosure, the one or more model objects are identified through at least one of, but not limited to, semantic object mapping, user interest profiling, social networking interactions, IoT Contents, and the like. In another embodiment of the disclosure, one or more model objects associated with the user context or UE context are also identified, without departing from the scope of the disclosure. The in-device contents 302 can be analyzed for content analysis (S304) and based on users interest a profile can be created by user interest profiling (S306). Further, the UE comprises of an model object identification module 308 that receives the objects analyzed by the content analysis (S304) and the user interest profiling (S306), and based on semantic topic 310, device or user context 311 and topic of interest 312, identifies whether the received model object belongs to any of the existing topic in the UE or is it a new topic. If the model object identification module 308 identifies that the object is new, then the UE identifies the topic under new topics 314. The topics identified under new topics 314 are needed to be registered and new model objects 316 are registered by the UE.

In an embodiment of the disclosure, the new identified model objects can be automatically registered using at least one of, but not limited to which are based on semantic topic, in-device context, and topic of interest, and the like, without departing from the scope of the disclosure. For instance, from an analyzed user context, the UE can register many Model objects, but all which might not be associated with the in-device contents instead a sub-set only might be associated.

The UE categorizes the registered model objects and stores them as category based registered model objects 318. The registered real model objects can be categorized as, but not limited to, educational, science and technology, services, advertisements, sports, geographical, commercial, automobiles, healthcare, products, political, institutions, and the like. The person having ordinarily skilled in the art can understand that the various other categories can be created and maintained by the UE for registering real model objects, without departing from the scope of the disclosure.

According to an embodiment of the disclosure, the in-device contents/context 302 are having association with the category based registered model objects 318. If the UE identifies that the object detected during identification of the RO is present in the UE already, then the UE can find the association between the detected object and category of the registered model object it belongs to. Further, according to another embodiment of the disclosure, the objects identified by the model object identification module 308 can also be associated with the category based registered model objects 318. The new model objects can be registered and saved in one of the category based registered model objects 318.

In another embodiment of the disclosure, the category based registered model objects 318 can be preloaded in the UE 200. In another embodiment of the disclosure the registered model objects can be obtained from a model object repository server present in a cloud 322 or can be stored in the model object repository server present in the cloud 322 for future usage. Storing of the one or more model objects in the model object repository server present in the cloud 322 allows plurality of users to search and find one or more model object through queries, wherein queries can provide object names, images and the like to find the appropriate model objects from the model object repository server, without departing from the scope of the disclosure.

In an embodiment of the disclosure, installation of one or more applications on the UE can also lead to registering of certain model objects. For example, if the user installs one or more applications with respect to cab booking, during installation, the UE may automatically install model objects associated with the cab booking application, thus to recognize any objects associated with the cab booking application and link the objects with the application icons, which will bring those applications to the home screen.

Figure 4A:
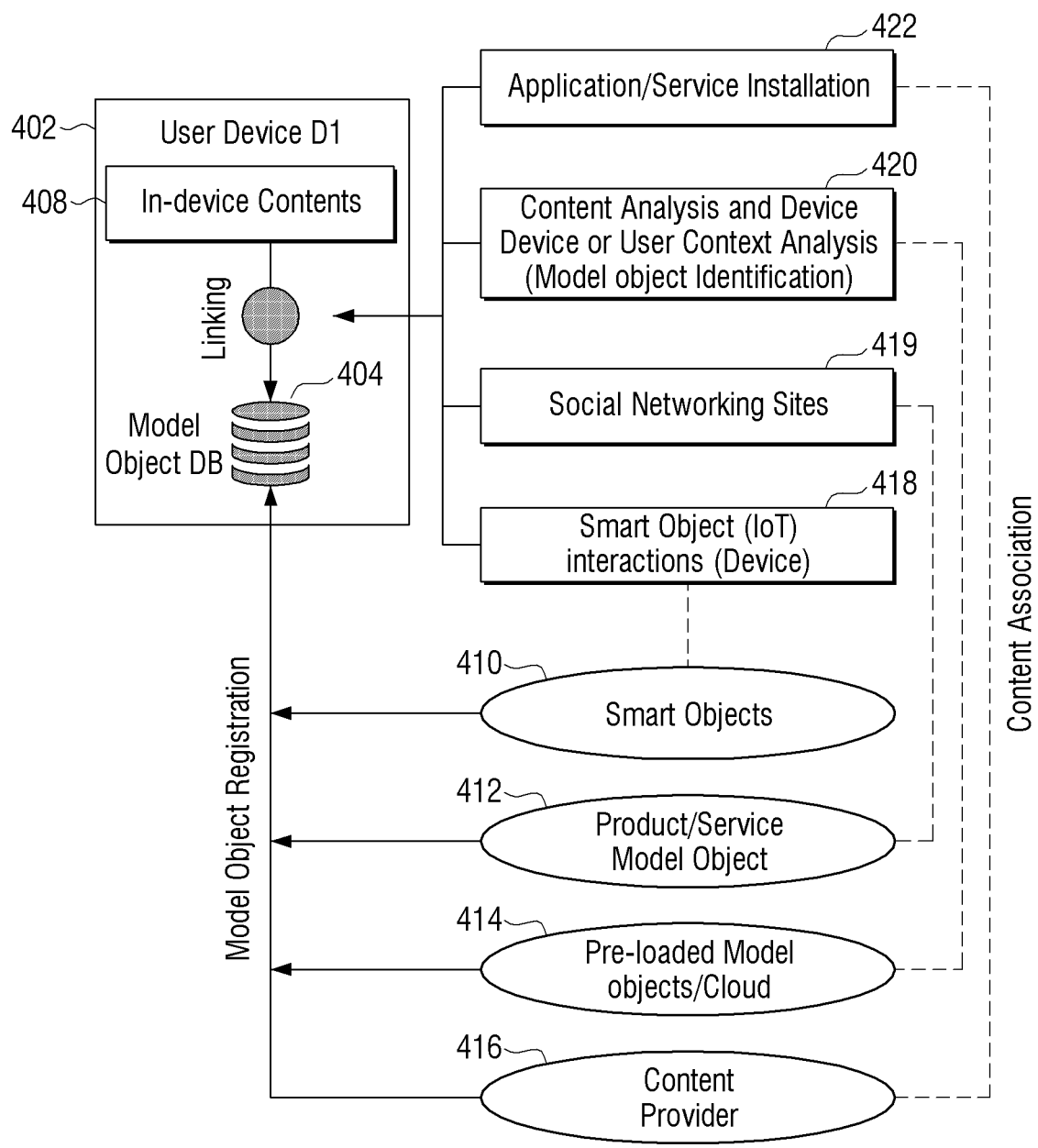
FIG. 4A is a schematic diagram illustrating an automatic method of identification of model objects, registration and associating the identified model objects to in-device contents, according to an embodiment of the disclosure.

FIG. 4A is a schematic diagram illustrating an automatic method of identification of model objects, registration and associating the identified model objects to in-device contents, according to an embodiment of the disclosure. According to the FIG. 4A, the user is having access to the user device D1 402, D1 402 can be connected to other user devices, such as, but not limited to, car, smart watch, house security system, laptop, and the like. The device D1 402 comprises of a model object database (DB) 404 that stores one or more model objects associated with the user. Further, the device D1 402 comprises of in-device contents 408 such as, but not limited to, applications, URL, notes and the like. The in-device contents can be linked with the model objects stored in the model object DB 404.

According to the FIG. 4, the model objects can be registered from various sources such as, but not limited to, smart objects connected with the device D1 402, product/service based model objects, pre-loaded model objects present in the device D1 or obtained from a cloud, content provided based model object registration, and the like.

As shown in FIG. 4, the blocks 410, 412, 414 and 416 shows the different methods by which the model objects are registered in the device D1. The blocks 418, 419, 420, 422 shows the method by which the in-device contents are associated with those registered model objects. The dotted lines shows how the method of registration is virtually connected with the in-device contend association methods.

Figure 4B:
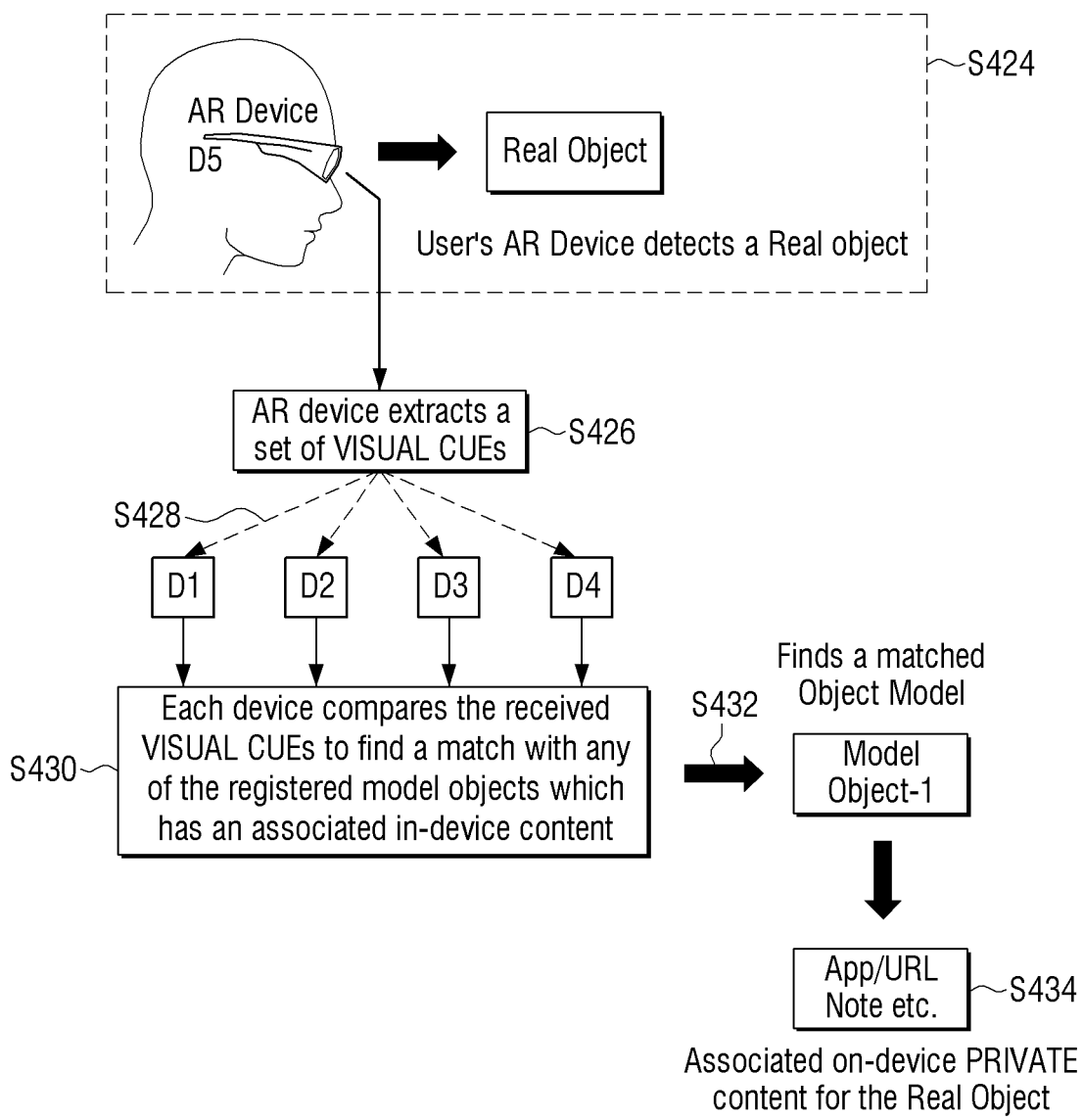
FIG. 4B is a schematic diagram illustrating a method for managing connected device contents based on Real Objects using an AR device, according to an embodiment of the disclosure.

FIG. 4B is a schematic diagram illustrating a method for managing connected device contents based on Real Objects using an AR device, according to an embodiment of the disclosure. According to the FIG. 4B, the method illustrates how different real objects are identified, and managed to match and associate one or more model objects with respect to identified real objects.

According to the FIG. 4B, the user is having access to 5 connected devices, D1, D2, D3, D4, and D5, wherein the device D5 is an augmented reality (AR) device. At operation 424, the user wears the device D5 and views real object, wherein the AR (D5) detects the real object. At operation 426, D5 extracts a set of visual cues from the identified real object, and at operation 428, shares the extracted visual cues with other connected devices D1, D2, D3 and D4 at operation 426.

At operation 430, each device D1, D2, D3 and D4 compares the received visual cues to find a match with any of the registered model objects which has associated in-device content. At operation 432, one of the devices D1, D2, D3 and D4 finds one or more matched model objects associated with the identified visual cues. Finally, at operation 434, the in-device contents that are associated with the matched model objects are organized by the related applications for easy access to the user.

The disclosure can be used in various use cases and a scenario for enhancing augmented reality experience on user equipment (UEs) based on one or more real objects (ROs). For an instance, the disclosure can enhance AR experience based on, but not limited to, content analysis, content provider based, e-learning based, social network service based, and the like, without departing from the scope of the disclosure.

According to an embodiment of the disclosure, a use case of enhancing augmented reality experience on user equipment (UEs) based on content analysis is described herein. According to the use case, different model objects associated with user, such as, but not limited to, different shopping sites, grocery stores, cloth stores, petrol stations, malls, and the like, that the user uses in his day to day life are stored in the UE. The user stores at least one of notes, webpages, documents, images, videos and the like in the UE, which acts as in-device contents. The in-device contents can be associated with the model objects and saved in the UE.

The user is on the move and wearing augmented reality (AR) device and viewing objects using the AR device. While moving, the AR device identifies different real objects (ROs) on the move and provides information about the ROs to the UE. The UE automatically checks for presence of any matching registered model objects. If the UE identifies a matching registered model object, then the UE further checks for the in-device contents. Also, the UE further performs content analysis based on the identified in-device contents. Upon finding the description of ROs in the in-device contents, the UE associates the in-device contents with the corresponding model objects.

For instance, user is moving in his vehicle wearing AR device and receives a message from his wife that comprises of grocery list. Initially, the mobile device has registered the model objects of one or more grocery shopping places in the device. The mobile device upon receiving the message from his wife, performs content analysis of the received message, and also automatically associates the grocery list to one or more of the model objects of the grocery shops. The user is on the move wearing AR device. The AR device identifies grocery shop and its logo as RO on the road. The AR device extracts the visual cues of the ROs and sends it to the mobile phone, wherein the mobile upon receiving the visual cues, matches the received visual cues with the registered model object that has an associated grocery list. Thus, the mobile phone provides notification to the user indicating that the user can go for grocery shopping in the identified grocery shop.

According to another use case, user has stored his monthly grocery list in his mobile phone. The user is on the move wearing AR device. User has identified real objects earlier and has stored visual cues associated with the RO as model objects in the mobile phone. The AR device identifies grocery shop and its logo as RO on the road. The AR device identifies the RO and performs content analysis, wherein the contents present in the grocery list is checked for the availability of the grocery item in the grocery shop. Based on the performed content analysis, the AR device informs the mobile phone about identified grocery shop. Upon identifying presence of grocery shop's model object stored in the mobile phone, the mobile phone checks the grocery list and identifies that the user is having grocery shopping pending. Thus, the mobile phone provides notification to the user indicating that the user can go for grocery shopping in the identified grocery shop.

According to another embodiment of the disclosure, a use case of enhancing augmented reality experience on user equipment (UEs) based on user or UE context is described herein. According to the use case, different model objects associated with the user, such as, but not limited to, different websites that you has visited, places that he has browsed or tagged in images, GPS locations that he has searched or visited, and the like are identified and stored in the UE. For instance, user accesses travel and tourism website and checks for ticket availability on a particular date for Agra. Based on user browsing, the UE identifies that user is travelling to Agra and thus stores Taj Mahal as model object in the memory of the UE.

According to another embodiment of the disclosure, a use case of enhancing augmented reality experience on user equipment (UEs) based on content provider is described herein. According to the use case, the UE identifies RO of a service provider/content provider and can suggest the user of the UE can access the service.

For instance, the user installs a cab service application in his mobile phone. During installation, the content provider automatically registers one or more model objects related with the cab service in the phone and also associates those model objects with the installed cab service application. During on the move, user is wearing AR device and the AR device identifies a cab with the logo of the cab service provider as RO. Upon identifying the RO, the AR device extracts the visual cues and sends it to the mobile device. The mobile matches those visual cues and finds a matching model object in the mobile phone. Finally, the mobile phone organizes the cab service application in the augmentation tray in the device home screen for easy access.

According to another embodiment of the disclosure, a use case of enhancing augmented reality experience on user equipment (UEs) based on e-learning is described herein. According to the use case, user might have visited and accessed e-learning content about an object in the UE. Later during viewing through an AR device, the AR device identifies the same object and identifies it as RO. The visual cues of the RO is extracted and send to the UE, which in turn matches with a registered model object associated with the identified RO. The UE accesses the content associated with the RO identified and provides e-learning content associated with the identified RO.

For instance, the user of the mobile phone reads e-learning content about flowers. The e-learning content about the flower can be identified as the content that user wishes to read again and thus is bookmarked for future study and stored in the mobile phone as model object. Later, the user wearing AR device views a flower, and the AR device identifies the flower as RO. The mobile phone matches the identified RO with a stored model object associated with the flower and thus provides e-learning content associated with the flower to the user.

According to another embodiment of the disclosure, a use case of enhancing augmented reality experience on user equipment (UEs) based on social networking services is described herein. According to the use case, the UE can associate contacts stored in the UE with model objects of different objects. Whenever the user of the UE views the objects using AR device, the UE can identify the model object stored in the UE and provide contacts related information to the user.

According to another embodiment of the disclosure, a use case of enhancing augmented reality experience on user equipment (UEs) based on services is described herein. According to the use case, the UE can associate contacts stored in the UE with model objects of different objects. Whenever the user of the UE views the objects using AR device, the UE can identify the model object stored in the UE and provide contacts related information to the user.

For instance, the user of the mobile device is registered with a review service and has entered his mobile number during sign-up process. At the server end, review service registers and associates model objects of the products or car with its reviews. Once the user logs in into the review service from his mobile device, the review service application launches prompting for phonebook access permission. Upon allowing by the user, the review service application automatically REGISTERS the model object of the product for each contact in the phonebook who has reviewed the products or cars in the service. Thus, the review service registers the product model objects in the phonebook.

Now, the user enters a car showroom to check for different cars. The user is wearing AR device and looks at different car models. While viewing the cars, the AR device identifies that car models present in the showroom and shares the visual cues with the mobile device. The mobile device receives the visual cues from the AR device and searches for registered model objects associated with the received visual cues. During searching, the mobile device identifies that the review service application is having model objects associated with the identified visual cues and thus accesses the review service application. The review service application provides the model objects associated with the identified visual cues and thus displays reviews related to the one or more cars viewed by the user, wherein the reviews where provided by one or more contacts present in his contact list.

In the above embodiment, an embodiment relating to a car is described, but the example is not limited thereto. For example, in a case in which an in-device content associated with a model object relating to a particular restaurant is associated and stored, an electronic device may, when viewing a particular restaurant through an AR device, provide a review written by contacts in a contact list or further provide information relating to a memo directly written by a user.

Figure 5:
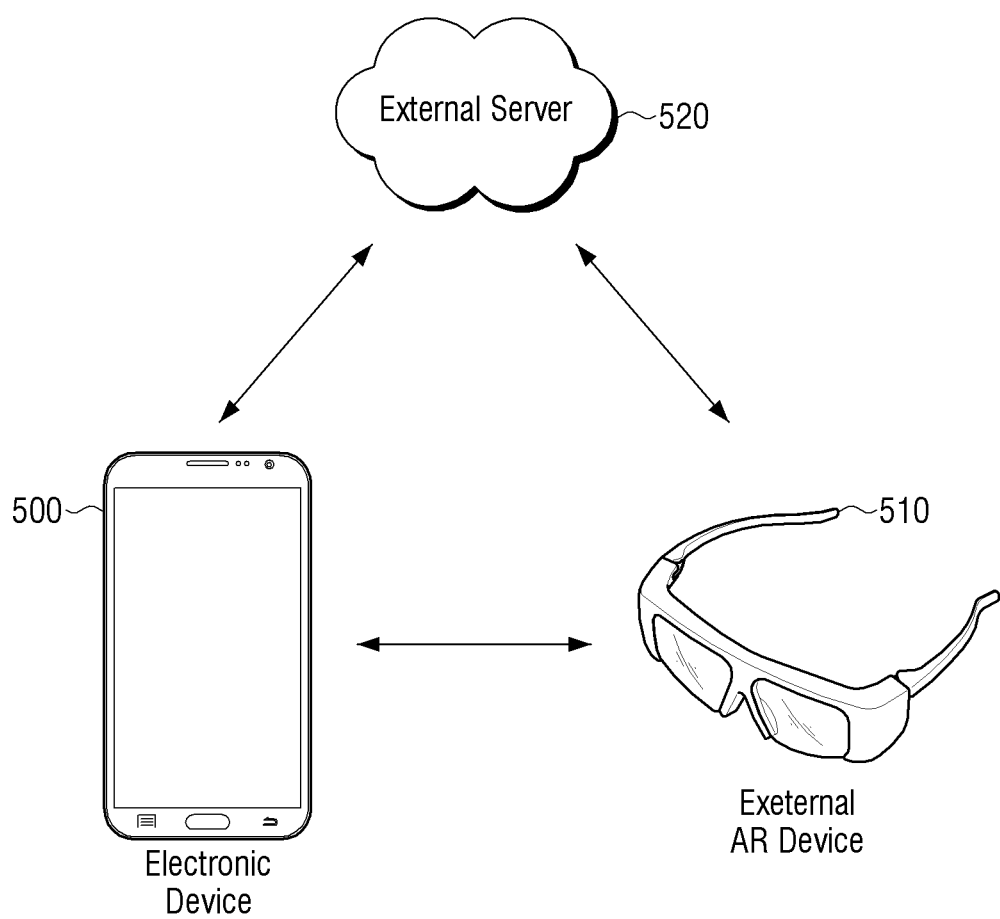
FIG. 5 is a diagram illustrating a system for enhancing an AR experience through an electronic device, according to an embodiment of the disclosure.

FIG. 5 is a diagram illustrating a system for enhancing an AR experience through an electronic device, according to an embodiment.

Referring to FIG. 5, an electronic device 500 may interconnected with an external AR device 510 and an external server 520. In this regard, the electronic device 500 may be identical to a connected user equipment 200, and the external server 520 may be identical to a cloud 322 as described above.

The electronic device 500 may be implemented as a portable device such as a smartphone as illustrated in FIG. 5, but is not limited thereto, and may be implemented as various types of devices provided with a display function, such as PC, tablet PC, PMP, PDA and the like.

In a case in which the electronic device 500 is implemented as a portable device provided with a touch screen so that a program is executed using a finger or a pen (e.g., a stylus pen). Hereinafter, it will be assumed that the electronic device 500 is implemented as a portable device for convenience of explanation. In addition, the AR device 510 may be implemented as an AR goggle as illustrated in FIG. 5, but is not limited thereto, and may be implemented as various types of devices provided with a means for identifying a real object (RO).

Referring to FIG. 5, the electronic device 500 may receive a model object category from the external server 520.

Meanwhile, the electronic device 500 may not only receive a model object category from the external server 520 but also automatically register a model object in the model object category. In other words, the electronic device 500 may directly analyze an activity history of a user and automatically register all model objects which are determined to be necessary to enhance AR. In addition, the electronic device 500 may perform communication so that a model object which is updated by registering a model object is transmitted to the external server 520 and stored in the external server 520.

The electronic device 500 may analyze an in-device content within the electronic device 500 and identify whether a model object corresponding to the analyzed in-device content is present. In a case in which an appropriate model object is present, the electronic device 500 and store the in-device content to be associated with the model object and register it.

The external AR device 510 may share activity information of a user with the external server 520 and the electronic device 500, and may transmit information relating to an RO to the electronic device 500.

The electronic device 500 may, in response to or based on activity information of the user being received from the external device 510, identify whether a model object relating to the corresponding activity is present. In a case in which a model object relating to the corresponding activity is not present in a model object category, the electronic device 500 may automatically register a new model object.

In addition, in response to or based on information relating to an RO being received from the external device 510, the electronic device 500 may identify a distinct part of the received RO and identify whether a model object corresponding to the distinct part is present. In a case in which a model object corresponding to an RO is associated with an in-device content, the electronic device 500 may enhance AR experience by using the in-device content. For example, the electronic device 500 may display an application associated with the in-device content to be easily selected by a user, or may display the in-device content to overlap with a screen currently displayed as AR. According to another embodiment, the electronic device 500 may process the in-device content and transmit it to the external device 510 so that the in-device content is overlapped with the screen displayed through the external device 510 and displayed.

Figure 6:
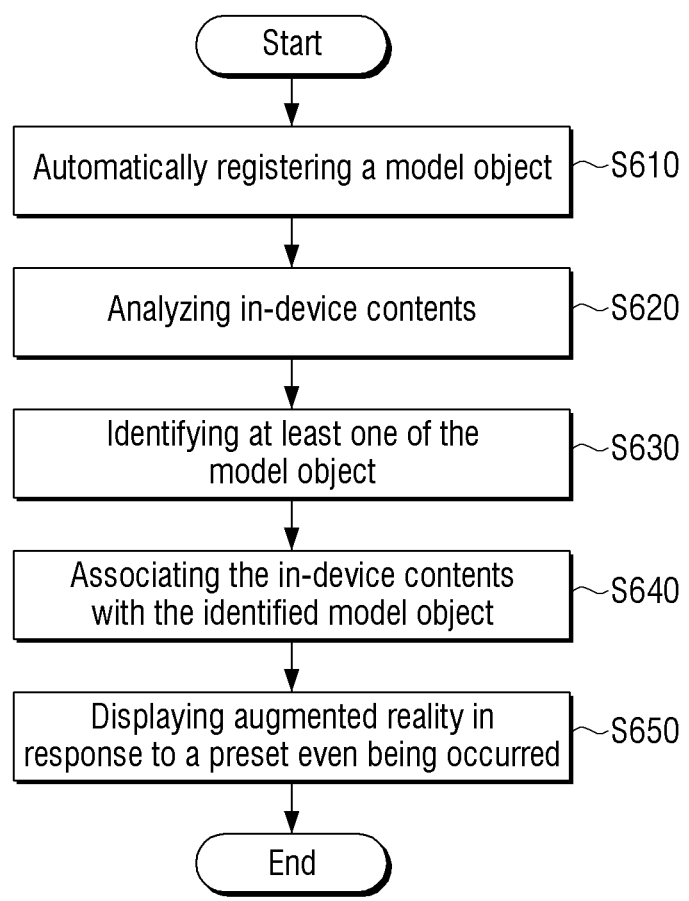
FIG. 6 is a block diagram illustrating a method for enhancing an AR experience by using a model object and in-device contents, according to an embodiment of the disclosure.

FIG. 6 is a block diagram illustrating a method for enhancing AR experience by using in-device contents of a model object, according to an embodiment.

Referring to FIG. 6, the electronic device 500 may automatically register a model object in a model object category, at operation S610. As described above, the model object category may be received from the external server 520.

Meanwhile, a model object includes descriptor information for identifying a particular RO. For example, to identify a particular RO, it is necessary to identify a distinct part which is not included in other ROs, and a model object may include information relating to this distinct part. In other words, the electronic device 500 may apply AR to a user based on the activity history of the user and automatically register a model object including the distinct part with respect to the RO to be provided.

The electronic device 500 may analyze in-device contents within the electronic device 500, at operation S620, and identify a model object which is registered to associate with the analyzed in-device content, at operation S630. In this regard, the in-device content may include various information such as a login history of the user with respect to a particular application or website, stored messages, stored photos, stored music, contact list, user profile, monitoring history of a user or a device, a social network service (SNS) activity history, a smart object interaction history, advertisement information, LBS information, and the like.

The electronic device 500 may, in response to or based on determining that a model object corresponding to the in-device contents is registered, process the in-device contents to be associated with the model object and stored, at operation S640. Thereafter, in response to or based on a predetermined event occurring, the electronic device 500 may provide an indication to enhance AR experience, at operation S650. In this regard, the predetermined event may be that the electronic device 500 acquires a visual cue regarding an RO corresponding to a model object. In more detail, in response to or based on determining that a visual cue acquired through a camera of the electronic device 500 or a visual cue acquired through the connected external AR device 510 corresponds to the model object, the electronic device 500 may provide the in-device content associated with the model object to enhance AR experience. In other words, the electronic device 500 may provide an application corresponding to the in-device content on a portion of a UI so that the application is easily used by the user, and may process the in-device content to display the in-device content to be overlapped with a display of the electronic device 500 and the external AR device 510.

Figure 7:
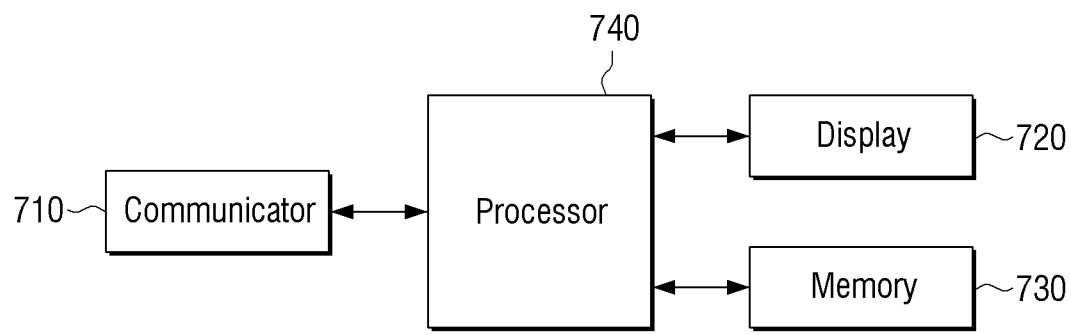
FIG. 7 is a diagram illustrating a configuration of an electronic device, according to an embodiment.

FIG. 7 is a diagram illustrating a configuration of an electronic device, according to an embodiment.

Referring to FIG. 7, the electronic device 500 may include a communicator 710, a display 720, a memory 730, and a processor 740. Although not illustrated in FIG. 7, the electronic device 500 may further include various features such as a camera, a user inputter, e.g., user input device, a speaker, and the like.

The communicator 710 is a feature that enables the electronic device 500 to communicate with the external server 520 and the external device 510. In this regard, the external device 510 may be one or more devices, or may be an AR device as described above. The communicator 710 may include a model object sharing module 212.

The communicator 710 may be a feature performing communication with various types of external devices according to various types of communication methods. The communicator 710 may include at least one from among a Wi-Fi chip, a Bluetooth chip, a wireless communication chip, and an NFC chip.

In particular, in a case in which a Wi-Fi chip or a Bluetooth chip is used, the communicator 710 may first transmit or receive various connection information including an SSID, a session key, and the like, perform communicative connection using the connection information, and then transmit or receive various information. The wireless communication chip refers to a chip which performs communication according to various communication standards, such as IEEE, Zigbee, $3^{rd}$ Generation (3G), $3^{rd}$ Generation Partnership Project (3GPP), Long Term Evolution (LTE), and the like. The NFC chip refers to a chip which operates using the NFC method using a band of 13.56 MHz from among various RF-ID frequency bands such as 135 kHz, 13.56 MHz, 433 MHz, 860-960 MHz, 2.45 GHz, and the like.

The display 720 is a feature for displaying various information to a user. In more detail, the display 720 may display a screen manipulated by a user, or may display a screen overlapped with the in-device contents to enhance AR. The display 720 may include a user inputter, e.g., the display 720 may include a user input device such as a touch screen.

The display 720 may be of various sizes. For example, the display 720 may have a size of 3 inches, 4 inches, 4.65 inches, 5 inches, 6.5 inches, 8.4 inches, 32 inches, 45 inches, and the like. The display 720 may include a plurality of pixels. In this regard, the number of width×the number of length of the plurality of pixels may be represented in a resolution.

The display 720 may be implemented as a display of various forms. For example, the display panel may be implemented using various display techniques, such as liquid crystal display (LCD), an organic light emitting diodes (OLED), active-matrix organic light-emitting diode (AM-OLED), liquid crystal on silicon (LcoS), digital light processing (DLP), or the like. In addition, the display 720 may be implemented in the form of a flexible display and coupled to at least one from among a front surface area, a side surface area, and a rear surface area of the electronic device 500.

The display 720 may be implemented as a touch screen of a layer structure. The touch screen may have not only a display function but also a function of detecting a touch input position, an area in which a touch input is received, and a touch input pressure, and may have not only a real-touch but also a proximity touch.

The memory 730 may store various data for overall operations of the electronic device 500, such as processing or controlling of the processor 740. The memory 730 may store a number of application programs (or applications) driven in the electronic device 500, data for operation of the electronic device 500, software, and instructions. In an embodiment, the software, application programs, or applications may contain one or more instructions. At least some of these application programs may be downloaded from an external server via wireless communication. In addition, at least some of these application programs may be present in the electronic device 500 from the release for the basic functioning of the electronic device 500. The application program may be stored in the memory 730, and may be driven to perform an operation (or function) of the electronic device 500 by the processor 740.

The memory 730 may be implemented as a non-volatile memory, a volatile memory, a flash memory, a hard disk drive (HDD), a solid state drive (SSD), and the like. The memory 730 may be accessed by the processor 740, and the reading/recording/editing/deleting/updating of data may be performed by the processor 740. The term "memory" as referred to herein may include a memory 730, a ROM within the provided 740, a RAM, or a memory card (not illustrated) (e.g., micro SD card and memory stick) mounted in the electronic device 500.

The processor 740 is a feature for overall operations of the electronic device 500. In more detail, the processor 740 controls the overall operations of the electronic device 500 by using various programs stored in the memory 730. Meanwhile, the processor 740 may include App1 202*a*, App2 202*b*, App3 202*c*, . . . , Appn 202*n*, an application firmware (FWA) 204, a device platform 206, a model object management module 214, a registration and content association module 208, a real objection recognition and model object matching module 210.

The processor 740 may automatically register a model object, and associate the registered model object with the corresponding in-device contents and register it. The detailed description is described above and will be omitted herein.

The processor 740 may perform identification of a distinct part of a particular RO through comparison and analysis of a visual cue which is an information identifier. The visual cue may include various information, such as a distinct color, a connectivity hierarchy distance density, a length area/volume color angle, a pattern, a pre-attentive cue, a symbolic cue, a convex hulls in cie space, a position on line, a lie factor, an orientation, and the like. A face recognition technique or a location recognition technique may be used in this comparison and analysis.

For example, in an embodiment, the property information of a location included in a location information identifier may include information relating to which a property of the corresponding location. For example, the property information of a location may include at least one of information relating to various locations including a shop, an office, a house, a department store and a train station.

For example, the location information included in the information identifier may include information relating to a location at which the electronic device 500 or the external AR device 510 is included. For example, the location information may include various location name information including a business name, a brand name, an office name and a house name and detailed information including an agent name and a user name of an office.

According to an embodiment, in a case in which the processor 740 identifies an information identifier and as a result, recognizes a business site associated with a particular model object including a shop, a store, an office, an agent, or the like, the processor 740 may control the display 730 to provide a discount coupon provided in the corresponding business site, which is an in-device content stored in the memory 730, by means of AR along with a homepage of the business site and a homepage link of the business site, or may process the in-device content and control the communicator 710 to transmit it to the external device 510.

The processor 740 may include a CPU, a RAM, a ROM, and a system bus. In this regard, the ROM is a feature in which a set of instructions for system booting is stored, and a CPU is configured to copy an operating system stored in the memory of the electronic device 500 according to an instruction stored in the ROM, to execute the O/S, and to boot the system. When booting is complete, the CPU may copy various applications stored in the memory 730 onto the RAM, execute them, and perform various operations. In the above embodiment, the processor includes only one CPU, but may be implemented as a plurality of CPUs (or DSP and SoC) at the time of implementation, i.e., the processor may include a plurality of processors.

According to an embodiment, the electronic device 500 may store history relating to a record of the user visiting a particular place, a photo photographed at a particular location, a history of calls and messages exchanged with other people, and the like. In this regard, the electronic device 500 may automatically register a model object based on an activity history of the user relating to a particular place (i.e., information relating to the particular place directly stored by the user or information relating to the particular place automatically stored in the electronic device 500). Further, the electronic device may process the automatically registered model object to be associated with the in-device content within the electronic device and store it.

For example, it will be assumed that the user visited and photographed Gyeongbokgung Palace in February of 2017, and that the user visited it again in April of 2017 and searched for restaurants near the Palace. In this case, the electronic device may automatically register a model object relating to Gyeongbokgung Palace, automatically register a Gyeongbokgung Palace model object based on the activity history of the user including a history of photographing at Gyeongbokgung Palace by the user, a search history, and the like, and store the in-device content as being associated with the model object. Thereafter, when the user visits Gyeongbokgung Palace in June of 2017 and sees the Palace (real object) through an external AR device paired with the electronic device, the electronic device may recognize the Gyeongbokgung Palace model object and provide the in-device content stored in the electronic device, such as information relating to Gyeongbokgung Palace stored by the user in February and April of 2017 and the like, in AR. The electronic device 500 may locate an application corresponding to the activity history of the user in a user interface to enhance the user experience. However, in a case in which the electronic device is not paired with an external AR device, the electronic device may recognize the Gyeongbokgung Palace via a camera of the electronic device, and likewise, locate an application in a user interface or provide the related history in AR.

According to an embodiment, an electronic device may store a history including an alarm repeated at a particular time, a contact history exchanged with other people at a particular time, an application repeatedly used at a particular time, and the like. In this regard, the electronic device may automatically register a model object corresponding to an activity history at a particular time, and further, process various information stored by the user or automatically stored in the electronic device to be associated with an automatically-registered model object and store it.

For example, in a case in which a user sets the alarm of the content "water the flower pot" to ring at 9 o'clock every day, the electronic device may automatically register a model object relating to the flower pot. The electronic device may associate a flower pot model object with a history of "flower the pot" (in-device content) at 9 o'clock every day and store it. Thereafter, when the user sees the flower pot (real object) through an external AR device, the electronic device may provide information such as "flower the pot at 9 o'clock". However, in a case in which the electronic device is not paired with an external AR device, the electronic device may recognize the flower pot via a camera of the electronic device, and likewise, locate an application in a user interface or provide the related history in AR.

According to an embodiment, the electronic device may identify a person and automatically register a particular person as a model object. In this case, the electronic device may automatically register a model object based on an activity history (i.e., information relating to the person directly stored by the user or various information automatically stored in the electronic device), and may process the automatically registered model object to be associated with the in-device content within the electronic device and store it.

For example, the electronic device may recognize an acquaintance included in the photographed photo and automatically register a model object relating to the acquaintance. Thereafter, the electronic device may process such that information relating to a time at which a photo capturing the user and the acquaintance are captured together, a location, a note taken by the user and the like to be associated with the model object and stored. However, the example is not limited thereto, and the electronic device may analyze a SNS history of the user and associate an event such as a party location to which the user is accompanied with the acquaintance and the like, with the model object and store it.

Thereafter, when the corresponding acquaintance is recognized via an external AR device or electronic device camera paired with the electronic device, the electronic device may organize the history stored as being associated with the model object of the acquaintance by time interval and provide it in AR.

The disclosure can be used in various other use cases and scenarios to provide better, necessary and important information to the user efficiently, without departing from the scope of the disclosure.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the disclosure. The following detailed description is, therefore, not to be taken in a limiting sense, and the scope of the disclosure is defined only by the appended claims.

What is claimed is:

1. A method for enhancing augmented reality experience on an electronic device, the method comprising:
   registering a model object in a model object category, the model object category comprising a plurality of model objects;
   receiving external content including Real Object (RO) from an augmented reality (AR) device, the external content depicting an environment surrounding the AR device and obtained by the AR device;
   analyzing an in-device content from a first application, among a plurality of applications installed and running on the electronic device, the first application being different and separately running from a second application, from among the plurality of applications, which provides the augmented reality experience on the electronic device;
   associating the in-device content with at least one model object among the plurality of the model objects based on analysis results of the in-device content;
   identifying, based on a set of visual cues obtained from the RO, a model object corresponding to the set of visual cues from among the plurality of model objects associated with the in-device content, and
   providing the augmented reality experience by overlapping and displaying AR information corresponding to the in-device content from the first application associated with the identified model object on the external content including the RO displayed on a screen.

2. The method of claim 1, wherein the in-device content comprises at least one of log-in history, text message, stored photo, stored music, contacts list, user-interest profile, contents about monitoring user or device context, contents about social networking service (SNS) interactions, smart object interactions history, advertisements information, and location based services (LBS) information.

3. The method of claim 1, wherein the registering the model object comprises at least one of:
   identifying and registering the model object for registration based on one of a user-interest profile;
   monitoring user or device context;
   identifying and registering the model object over social networking service (SNS) interactions;
   performing registration during smart object interactions;
   performing registration during application installations;
   identifying and registering the model object registered by services;
   identifying and registering the model object based on location based services (LBS); and
   identifying and registering the model object registered during advertisements.

4. The method of claim 1, wherein the analyzing is performed using at least one of a user interest based content analysis, semantic based content analysis, and context based content analysis.

5. The method of claim 1, wherein the associating is performed based on at least one of:
   the analyzing the in-device content;
   user interest profiling; and
   user or device context capturing.

6. The method of claim 1, wherein the model object category is stored on at least one of:
   a memory of the electronic device;
   a cloud storage; and
   a database of an AR server.

7. The method of claim 1 further comprising automatically registering the model object associated with the in-device content on the model object category based on the model object associated with the in-device content being identified not to exist in the model object category.

8. The method of claim 1 further comprising enabling model object management by performing at least one of:
   de-registering of one or more model objects of the plurality of model objects; and
   obtaining model object registration decisions.

9. The method of claim 1, wherein the displaying the AR comprises:
   comparing the set of visual cues with the identified model object;
   customizing a device application behavior based on the in-device content associated with the identified model object; and
   enhancing user interaction by placing the device application on a user interface of the electronic device.

10. A method for enhancing augmented reality experience on one or more connected electronic devices using in-device content, the method comprising:
    receiving external content depicting an environment surrounding an augmented reality (AR) device and obtained by the AR device;
    identifying, by the AR device, at least one real object (RO) in the external content;
    obtaining, by the AR device, a set of visual cues of the at least one RO;
    sharing, by the AR device, the obtained set of visual cues with the one or more connected electronic devices;
    comparing, by one of the one or more connected electronic devices, the set of visual cues received from the AR device with a predefined model object category, the predefined model object category comprising a plurality of model objects;

associating, by the one of the one or more connected electronic devices, an in-device content for the RO with at least one model object, among the plurality of model objects, the in-device content being received from a first application, among a plurality of applications installed and running on the electronic device, and the first application being different and separately running from a second application, from among the plurality of applications, which provides the augmented reality experience on the electronic device;

based on the obtained set of visual cues, identifying, by the one of the one or more connected electronic devices, a model object associated with the in-device content; and providing the augmented reality experience by overlapping and displaying AR information corresponding to the in-device content from the first application associated with the identified model object on the external content including the RO displayed on a screen.

11. An electronic device for enhancing augmented reality experience, the electronic device comprising:
a display;
processor;
wherein the processor is configured to:
register a model object in a model object category, the model object category comprising a plurality of model objects,
receive external content including Real Object (RO) from an augmented reality (AR) device, the external content depicting an environment surrounding the AR device and obtained by the AR device,
analyze in-device content from a first application, among a plurality of applications installed and running on the electronic device, the first application being different and separately running from a second application, from among the plurality of applications, which provides the augmented reality experience on the electronic device,
associate the in-device content with at least one model object, among the plurality of model objects based on analysis results of the in-device content,
identify, based on a set of visual cues obtained from the RO, a model object corresponding to the set of visual cues from among the plurality of model objects associated with the in-device content, and
control the display to provide the augmented reality experience by overlapping and displaying AR information corresponding to the in-device content from the first application associated with the identified model object on the external content including the RO displayed on a screen.

12. The electronic device of claim 11, wherein the in-device content comprises at least one of log-in history, text message, stored photo, stored music, contacts list, user-interest profile, contents about monitoring user or device context, contents about social networking service (SNS) interactions, smart object interactions history, advertisements information, and location based services (LBS) information.

13. The electronic device of claim 11, wherein processor is further configured to perform at least one of:
identify and register the model object for registration based on one of a user-interest profile,
monitor user or device context,
identify and register the model object over social networking service (SNS) interactions,
perform registration during smart object interactions,
perform registration during application installations,
identify and register the model object registered by services,
identify and register the model object based on location based services (LBS), and
identify and register the model object registered during advertisements.

14. The electronic device of claim 11, wherein the processor is further configured to analyze the in-device content using at least one of a user interest based content analysis, semantic based content analysis, and context based content analysis.

15. The electronic device of claim 11, wherein the processor is further configured to associate the in-device content with the identified model object based on at least one of:
the analyzing of the in-device content;
user interest profiling; and
user or device context capturing.

16. The electronic device of claim 11, wherein the model object category is stored on at least one of:
a memory of the electronic device;
a cloud storage; and
a database of an AR server.

17. The electronic device of claim 11, wherein the processor is further configured to automatically register the model object associated with the in-device content on the model object category based on the model object associated with the in-device content being identified not to exist in the model object category.

18. The electronic device of claim 11, wherein the processor is further configured to de-register of one or more model objects of the plurality of model objects and obtain model object registration decisions.

19. The electronic device of claim 11, wherein the processor is further configured to:
compare the set of visual cues with the identified model object,
customize a device application behavior based on the in-device content associated with the identified model object, and
enhance user interaction by placing the device application on a user interface of the electronic device.

* * * * *